United States Patent
Williams

(10) Patent No.: US 9,765,512 B2
(45) Date of Patent: Sep. 19, 2017

(54) SPACE FRAME STRUCTURE

(71) Applicant: AIRBUS OPERATIONS LIMITED, Bristol (GB)

(72) Inventor: Stephen Williams, Bristol (GB)

(73) Assignee: Airbus Operations Limited, Bristol (GB)

( * ) Notice: Subject to any disclaimer, the term of this patent is extended or adjusted under 35 U.S.C. 154(b) by 1213 days.

(21) Appl. No.: 13/793,117

(22) Filed: Mar. 11, 2013

(65) Prior Publication Data
US 2013/0302172 A1   Nov. 14, 2013

(30) Foreign Application Priority Data
Mar. 9, 2012   (GB) .................................. 1204231.3

(51) Int. Cl.
*B64C 3/22*     (2006.01)
*E04B 1/19*    (2006.01)
(Continued)

(52) U.S. Cl.
CPC ................ *E04B 1/19* (2013.01); *B29C 70/38* (2013.01); *B29D 99/0007* (2013.01); *B64C 3/22* (2013.01);
(Continued)

(58) Field of Classification Search
USPC .... 244/123.4, 123.1, 123.7, 119, 123.2, 131, 244/120
See application file for complete search history.

(56) References Cited

U.S. PATENT DOCUMENTS 2,241,972 A * 5/1941 Wagner .................... B64C 3/00
244/123.12
2,503,450 A * 4/1950 Nebesar ................... B64C 3/00
220/DIG. 23
(Continued)

FOREIGN PATENT DOCUMENTS

EP        2 433 860        3/2012
JP        3-234615        10/1991
(Continued)

OTHER PUBLICATIONS

Extended European Search Report dated Aug. 9, 2013 in EP 13157402.2-1754.
(Continued)

*Primary Examiner* — Christopher P Ellis
(74) *Attorney, Agent, or Firm* — Nixon & Vanderhye P.C.

(57) ABSTRACT

A structure comprising a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s). Also a method of forming the structure. Also An aerofoil structure, comprising a space frame defining a cage adapted to receive upper and lower covers so as to form upper and lower aerodynamic surfaces of the aerofoil, and at least one spar extending generally spanwise across the structure, wherein the spar includes a spar web and upper and lower spar caps, and wherein the spar web is disposed on one of an interior or exterior side of the cage, and the spar caps are attached to the other of the interior or exterior side of the cage.

22 Claims, 13 Drawing Sheets

(51) Int. Cl.
 B29C 70/38 (2006.01)
 B29D 99/00 (2010.01)
 F01D 5/14 (2006.01)
 B29L 31/30 (2006.01)
(52) U.S. Cl.
 CPC ...... *F01D 5/147* (2013.01); *B29L 2031/3076* (2013.01); *Y02T 50/433* (2013.01); *Y10T 156/10* (2015.01)

(56) References Cited

U.S. PATENT DOCUMENTS

| | | | | |
|---|---|---|---|---|
| 4,795,310 | A | | 1/1989 | McArdle et al. |
| 5,216,799 | A | * | 6/1993 | Charnock ................. B64C 3/18 244/133 |
| 5,534,354 | A | * | 7/1996 | Gregg .................. B21D 26/055 244/123.3 |
| 5,567,509 | A | | 10/1996 | Gautier |
| 7,244,487 | B2 | * | 7/2007 | Brantley ............... B29C 65/562 244/123.7 |
| 7,891,608 | B2 | * | 2/2011 | Rawdon .................... B64C 1/08 244/118.1 |
| 8,042,767 | B2 | * | 10/2011 | Velicki .................. B29C 70/443 244/117 R |
| 8,128,025 | B2 | * | 3/2012 | Rawdon .................... B64C 1/08 244/117 R |
| 8,205,834 | B2 | * | 6/2012 | Maenz ..................... B64C 1/26 244/123.4 |
| 8,322,656 | B2 | * | 12/2012 | Pahl .......................... B64C 3/22 244/119 |
| 8,403,263 | B2 | * | 3/2013 | Luettig ................... B64C 1/064 244/119 |
| 8,418,962 | B2 | * | 4/2013 | Piehl ........................ B32B 3/18 244/123.13 |
| 8,490,920 | B2 | * | 7/2013 | Karem ..................... B64C 1/10 244/119 |
| 2002/0056788 | A1 | | 5/2002 | Anderson et al. |
| 2004/0194411 | A1 | * | 10/2004 | Olsson ..................... E04B 1/19 52/633 |
| 2006/0249626 | A1 | * | 11/2006 | Simpson .................. B64C 3/20 244/123.1 |
| 2008/0292849 | A1 | * | 11/2008 | Stephan .................... B32B 3/02 428/192 |
| 2009/0220747 | A1 | | 9/2009 | Karem |
| 2012/0061515 | A1 | * | 3/2012 | Remene .................. B29C 70/30 244/123.1 |
| 2013/0075526 | A1 | * | 3/2013 | Griess ...................... B32B 5/26 244/123.1 |
| 2014/0037873 | A1 | * | 2/2014 | Cheung .................... B32B 3/06 428/34.1 |
| 2015/0251768 | A1 | * | 9/2015 | Woolley ................. B64D 27/26 244/54 |
| 2016/0208476 | A1 | * | 7/2016 | Wadley ..................... C23C 8/22 |

FOREIGN PATENT DOCUMENTS

WO   WO 2009/044362    4/2009
WO   WO 2012/045871    4/2012

OTHER PUBLICATIONS

Search Report for GB 1204231.3 dated Jun. 19, 2012.
Search Report for GB 1204231.3 dated Jul. 22, 2012.

* cited by examiner

SPACE FRAME STRUCTURE

FIELD OF THE INVENTION

The invention relates to a structure comprising a space frame, and a method of forming a space frame structure.

BACKGROUND OF THE INVENTION

A typical aerofoil structure, e.g. for aircraft, comprises a torsion "wing box" having front and rear longitudinal spars, a plurality of transverse ribs attached to the front and rear spars and upper and lower covers extending between the front and rear spars. A plurality of longitudinal stringers are typically attached to or integrally formed with the covers to stiffen and strengthen the covers so that the thickness, and therefore weight, of the covers can be reduced. The ribs, spars and covers, and sometimes also the stringers, are each manufactured as separate components which are fastened or otherwise fixed together to form the aerofoil structure.

Over recent decades there has been a move towards greater use of composite materials in aerofoil structures to replace traditional metallic materials with the aim of reducing structural weight. Commonly used composite materials includes fibre reinforced polymer laminates, such as carbon fibre reinforced polymers. Currently, composite aerofoil structures are generally similar in design to the metallic structures which they have replaced, having stringers attached to or formed with covers, which are bolted or bonded to the spar and rib components.

To date, composite materials have not fulfilled their potential, to the extent that hybrid structures including composite and metallic components (e.g. metallic ribs with composite spars and composite covers) have been shown to sometimes be superior to all composite structures. The direct replacement of metallic components with similar composite components formed using composite materials often fails to make the most efficient use of composite materials. Known composite, or hybrid, aerofoil structures are therefore not optimised and have a large number of components. The direct replacement of metallic components with similar composite components also fails to maximise the properties and manufacturing processes which are possible with composite materials.

SUMMARY OF THE INVENTION

A first aspect of the invention provides a structure comprising a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s).

A second aspect of the invention provides a method of forming a space frame structure, the method comprising the steps of: a) providing ply deposition means for depositing ply layers; and b) depositing the ply layers to form a plurality of laminate strut sections that cross at one or more locations within the structure to define a node at each respective crossing location, such that the ply layers of the crossing strut sections are interleaved at the node(s).

A third aspect of the invention provides an aerofoil structure, comprising a space frame defining a cage adapted to receive upper and lower covers so as to form upper and lower aerodynamic surfaces of the aerofoil, and at least one spar extending generally spanwise across the structure, wherein the spar includes a spar web and upper and lower spar caps, and wherein the spar web is disposed on one of an interior or exterior side of the cage, and the spar caps are attached to the other of the interior or exterior side of the cage.

Each node within the structure is defined where one strut section crosses one or more other strut sections of the space frame.

The strut sections crossing at a node may be continuous, so that each of the strut sections crossing at the node extend into the node, through the node and out from the opposite side of the node. Alternatively, at least one of the strut sections crossing another strut section at a node may end at that node, so that one or more of the strut sections extends into the node and forms part of the node but does not extend out from the opposite side of the node.

By providing a space frame structure having strut sections which cross at interleaved nodes, it is possible to increase the strength and stiffness of the space frame compared to an equivalent structure having crossing strut sections which are mechanically fastened or bonded at the nodes or to a structure in which the strut sections are not attached to or integrally formed with each other. The weight of the structure may also be reduced due to simplification of joints which do not require mechanical fastening or bonding.

A node may have singly alternating ply layers, so that each ply layer is sandwiched between two ply layers from another strut section or other strut sections. Alternatively the ply layers may not alternate singly at a node, so that at least some of the ply layers are adjacent another ply layer from the same strut section or are sandwiched between two other ply layers of the same strut section.

One or more of the strut sections may have a generally non-planar (i.e. a three-dimensional) profile along at least some of their length. The three-dimensional profile may be adapted to give the strut sections greater stiffness compared to struts with a generally planar profile. The struts may, for example, have an L-section or a C-section or a T-section or a box section or a top-hat section, or any other suitable strut section as will be appreciated by those skilled in the art. Alternatively, at least one of the strut sections may have a generally planar profile.

At least one of the nodes may be substantially planar.

The profile of the generally non-planar strut section(s) may flatten as it approaches a node. By flattening the profile of strut sections at the nodes it is possible to achieve a simple, compact, interleaved node.

Generally, any of the nodes may be planar or may be non-planar. A node may be formed at the crossing point of two or more strut sections each having a generally three-dimensional profile; or of two or more strut sections each having substantially planar profiles; or of two or more strut sections of which at least one has a three-dimensional profile and at least one has a substantially planar profile.

At least one of the strut sections may have a termination. The termination may be substantially planar. Where the strut section having the termination has a generally three-dimensional profile, that three-dimensional profile may flatten as it approaches the termination so as to provide the substantially planar termination. By flattening the profile at its termination the termination may be more readily attached to another component, and may be better adapted to transfer load to another component. When the structure is used in an aircraft wing structure, a strut section having a flattened profile at its termination may be better adapted to transfer load to a wing cover or a fuselage component or any other component which is attached to the wing structure.

The space frame may include a composite material. For example, at least part of the space frame may be formed as a laminate of fibre reinforced polymer ply layers. The composite material may, for example, include carbon fibre and/or glass fibre and/or Kevlar ply layers in a polymer matrix, for example a resin (thermosetting) matrix or a thermoplastic matrix. Other suitable fibre and/or matrix materials may be used, as will be appreciated by those skilled in the art. Generally, the strut sections may comprise any material suitable for forming a laminate component.

The space frame having the interleaved nodes may define a generally two-dimensional structure, e.g. a lattice panel. The generally two-dimensional space frame may be substantially planar or may have curvature. A plurality of discrete two-dimensional space frames may be assembled to define sides of a three-dimensional structure, e.g. a cage. Alternatively, the space frame may define a generally three-dimensional structure. The three-dimensional structure may have at least two integrally formed sides. The three-dimensional structure may define an integrally formed cage.

The structure may comprise a corner element disposed between two adjacent sides of the space frame. The corner element may be on the inside or outside of the corner, and may be attached to the space frame by bonding or using mechanical fasteners, or by a combination of bonding and mechanical fasteners. Alternatively, the corner element(s) may be integrally formed with the space frame. The corner element(s) may extend between a plurality of strut sections at the edge of the structure where the adjacent sides of the space frame intersect.

The space frame may be a cage. The space frame may define an enclosure having an inside and an outside. The cage may have at least one open side or end. The cage may have an open or closed cross section. The sides of the cage may be formed as a single integrated structure or alternatively the cage may be formed by attaching a plurality of space frame portions together to form the cage.

The space frame may include opposing nodes and the structure may further include a structural member extending between the nodes. The structural member may be adapted to react loads between the opposing nodes. The structural member may, for example, be arranged to react out of plane forces applied to a side of the cage, and may be arranged to function in tension and/or compression and/or shear. The opposing nodes need not be directly opposite but may be generally opposing. The structural member extending between the opposing nodes may take a variety of forms, and may be, for example, a tubular member.

The space frame may include at least one loop portion which extends around the perimeter of the space frame. The loop portion may comprise one or more of the strut sections. The loop portion may form a closed loop. A plurality of closed loops may be provided spaced apart in a longitudinal direction of the space frame. Alternatively the loop portion may form an open loop, for example a loop which extends around the perimeter of a cage one or more times in the manner of a helix.

The structure may further comprise a panel, e.g. of sheet material, attached to a side of the space frame. The space frame may be adapted to strengthen and/or stiffen a panel which is attached to it, or alternatively the panel may comprise a non-structural cladding. The panel may be generally continuous and is to be distinguished from the lattice panel defined by the underlying space frame structure.

The panel may be attached to one or more of the strut sections. The strut sections may have attachment surfaces for attachment of a panel. For example, a strut section having an L-section or a C-section profile may have a base or wall which is adapted to engage with the panel, or a strut section having a top-hat shaped profile may have a pair of flanges which are adapted to engage with the panel. A panel may be attached to the space frame by bonding or using mechanical fasteners, or by a combination of bonding and mechanical fasteners, or any other suitable attachment means. Alternatively, a panel may be integrally formed with the space frame, for example by co-curing.

The structure may further comprise at least one other panel, e.g. of sheet material, to be attached to a respective other side of the space frame.

Alternatively, the space frame may not have a primary function of reinforcing a panel, and may not have a panel attached to it. In particular, the space frame may define an open lattice structure, e.g. for a construction crane or the like, that has no external cladding panels.

A panel may be attached to the space frame, where a node of the space frame defines a land for supporting a surface of the panel. The panel may be fastened or otherwise attached to the land. Alternatively, the panel may be attached to the space frame, where a node of the space frame is spaced from a surface of the panel in a direction normal to the panel surface. Spacing the node from the panel apart from the surface may improve the ability of the space frame to stiffen and/or strengthen the panel at the node compared to a space frame having a node which sits against the surface of the panel due to the increased polar moment.

A further aspect of the invention provides an aerofoil comprising the structure according to the first aspect of the invention. The aerofoil may be for an aircraft and may be a fixed wing, a stabiliser, a moveable control surface, or a rotary wing, for example. Alternatively, the aerofoil may be a wind turbine blade, or any other aerofoil application. In a yet further aspect, the structure may be used in a hydrofoil, or any other fluid-foil.

An aerofoil may comprise upper and lower covers attached to opposite sides of the space frame. The aerofoil may further comprise front and rear spars attached to opposite sides of the space frame. Each spar may comprise a spar web and upper and lower spar caps. The spar web may be disposed on one of an interior or exterior side of the cage, and the spar caps may be attached to or integrally formed with the other of the interior or exterior side of the cage.

The space frame may replace the stringers traditionally used in an aerofoil torsion box structure. By providing the space frame with structural members extending between the opposing sides of the space frame, it also becomes possible to replace the ribs traditionally used in the torsion box.

The integrated strut sections of the space frame may provide a more structurally efficient design than individual ribs and stringers used in a conventional torsion box. The aerofoil structure may, therefore, be lighter, resulting in increased fuel efficiency and lower emissions, and reduced parts count resulting in reduced manufacturing and operating costs.

The structural members used to react out of plane loads between the covers may have a smaller volume than the ribs which they replace. The free internal volume within the wing may therefore be increased, resulting in an increase in the maximum volume of fuel which can be carried within the wing, thereby increasing the range of the aircraft.

The strut sections may be substantially aligned with the load carrying direction of the structure. By arranging the strut sections in the desired load carrying directions, the structure may be more structurally efficient that conventional longitudinal stringers and transverse ribs. The directional properties of a material such as carbon fibre may therefore be used to maximise the efficiency of the structure by aligning the predominant direction of the fibres in the ply layers within each strut section with the local load carrying direction.

In the context of an aerofoil structure, the strut sections may, for example, be more closely aligned with the chordwise direction of the aerofoil towards the tip end to resist aerofoil twist and more closely aligned with the spanwise direction of the aerofoil towards the root end to resist bending and lift loads. Alternatively, the strut sections may generally be more closely aligned with the spanwise direction than the chordwise direction across the majority of the aerofoil structure to resist wing bending.

In the method of the second aspect of the invention, the ply layers may be deposited on a tool. The ply layers may be deposited using one or more ply deposition means in an automated, semi-automated or manual process. For example, the ply layers may be deposited using one or more ply deposition heads. The ply layers may be deposited as thermosetting or thermoplastic pre-preg layers or alternatively as dry or wetted-out fibrous plies. The ply layers may be woven or unidirectional, or any other suitable form of ply layers for making a laminate material.

The ply layers may be deposited in common stock tape widths. Alternatively the ply layers may be deposited in a custom width, or may have a width which varies as the ply is deposited or is subsequently trimmed.

The strut sections may each have a common width, ply lay-up, material and/or profile. Alternatively the width, ply lay-up, material and/or profile of a strut section may vary along its length, and the width, ply orientation, material and/or profile of a strut section may be different to other strut sections within the structure.

Each strut section may have a majority of its fibres aligned with the longitudinal axis of the strut section. Alternatively, the strut sections may have any ply lay-up to provide desirable structural performance characteristics.

The ply layers may be deposited on a tool which is shaped to provide at least one of the strut sections with a non-planar (three-dimensional) cross-sectional profile.

The structure may be rotated relative to the ply deposition means during the ply deposition process. Preferably, the structure rotates about its longitudinal, or alternatively the structure may remain stationary while the ply deposition means moves. The rotation may occur at a constant speed or alternatively at a variable speed, e.g. cyclical variation. The rotation may be continuous during the ply deposition process or alternatively there may be periods in which the rotation does not occur.

The ply deposition means may move relative to the structure in the direction of the longitudinal axis of the structure during the ply deposition process. The structure may remain stationary in the longitudinal direction (but may still rotate) while the ply deposition means moves in the direction of the longitudinal axis. Alternatively, the structure may move in the longitudinal direction and the ply deposition means may remain stationary in the longitudinal direction (but may still rotate).

DETAILED DESCRIPTION OF EMBODIMENT(S)

Figure 1:
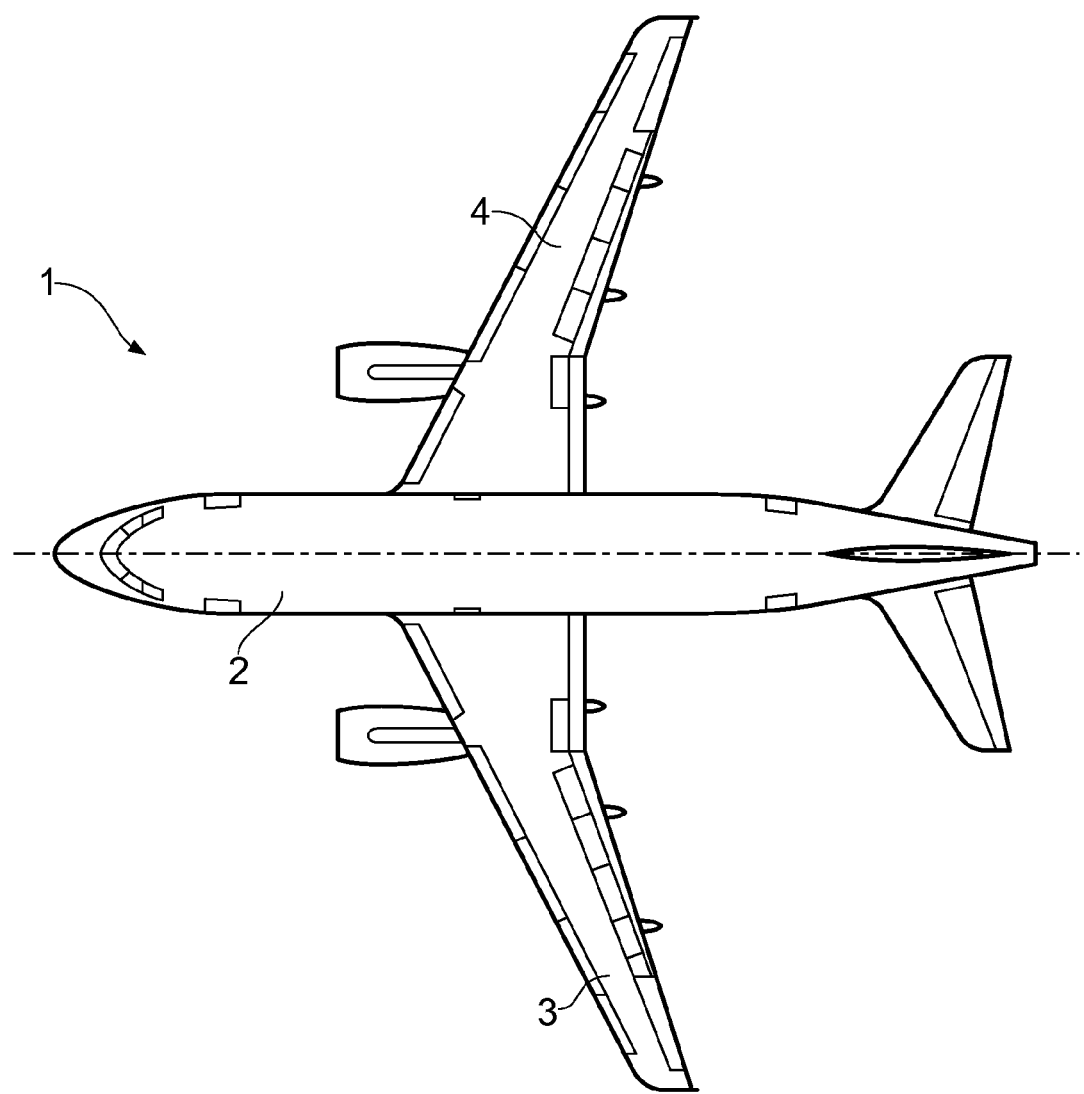
FIG. 1 illustrates a plan view of an aircraft.
Figure 2:
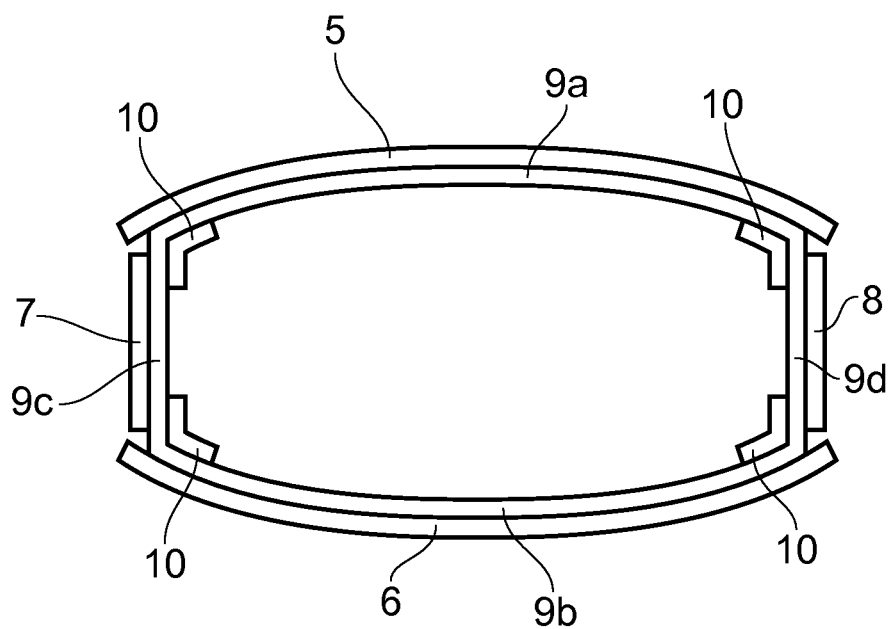
FIG. 2 illustrates a schematic cross section view through the wing of the aircraft, which includes a torsion "wing box" having a space frame cage structure, front and rear spars, and upper and lower wing covers.

FIG. 1 illustrates an aircraft 1 having a fuselage 2 and wings 3, 4. As shown schematically in FIG. 2, the wing 3 has a torsion wing box structure comprising upper and lower covers 5, 6; front and rear spar webs 7, 8; a space frame lattice-type cage 9; and spar caps 10. The covers 5, 6 define, in part, the upper and lower aerodynamic surfaces of the aerofoil profile of the wing 3. The spars webs 7, 8 and their respective spar caps 10 together form the front and rear spars of the wing, which extend spanwise in the wing longitudinal direction. The wing 3 also comprises leading and trailing edge structures (not shown) that complete the aerofoil profile, and various other components which have been omitted from FIG. 2 so as not to detract from the understanding of the invention.

Figure 3:
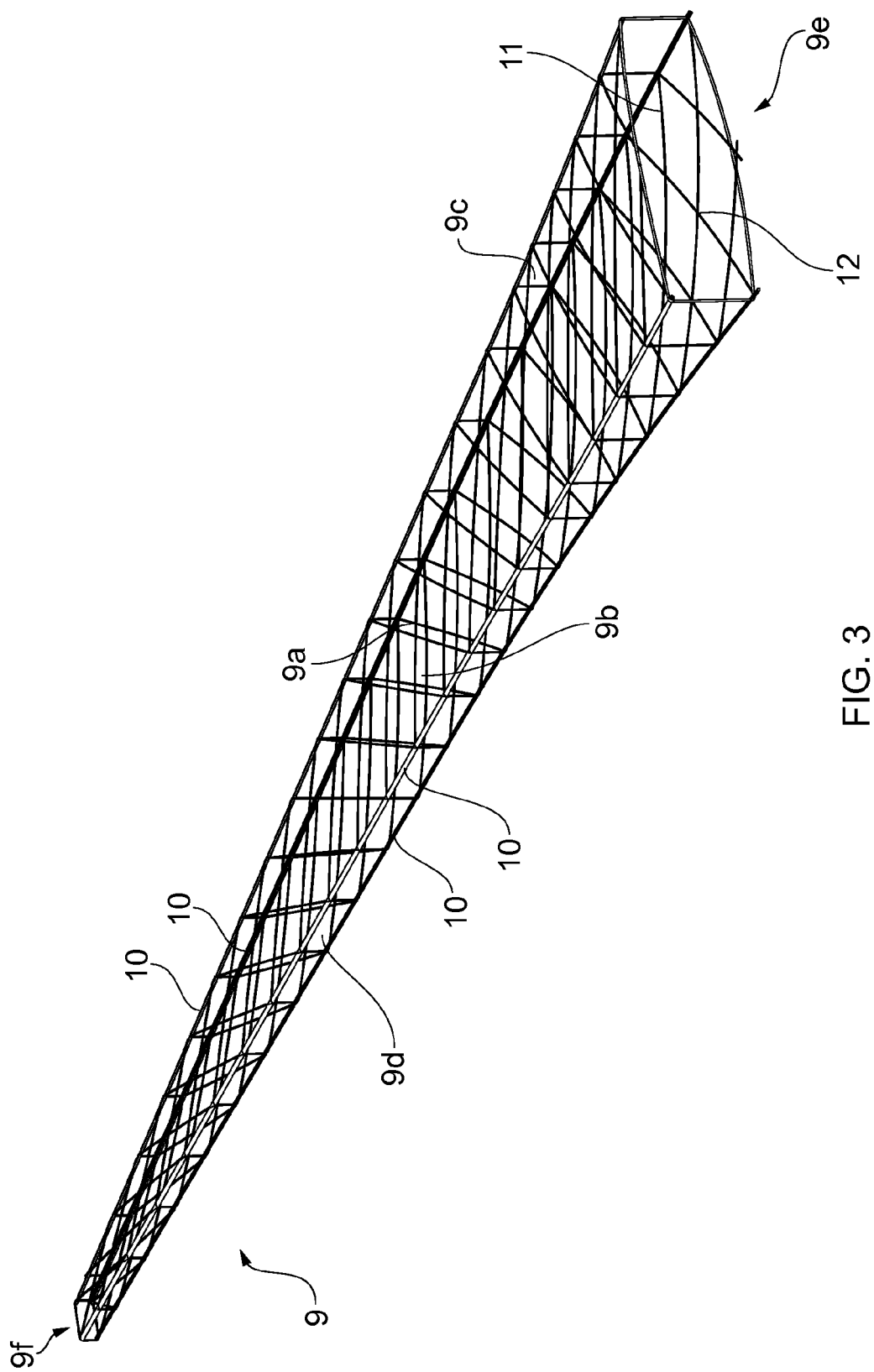
FIG. 3 illustrates the space frame structure which includes a plurality of integrally formed laminate strut sections.

The space frame cage 9, shown in FIG. 3, is an integrally formed space frame structure formed from laminate composite materials, e.g. carbon fibre reinforced polymer plies. The cage 9 has upper and lower faces 9a, 9b, front and rear faces 9c, 9d, and inboard and outboard ends 9e, 9f. The faces 9a-9d are each integrally formed so that the cage 9 is a unitary component. The upper and lower covers 5, 6 are attached to the outside of the upper and lower faces 9a, 9b respectively and the front and rear spar webs 7, 8 are attached to the outside of the front and rear faces 9c, 9d respectively. The cage 9 is open at its inboard and outboard ends 9e and 9f and the inboard end 9e is adapted for attachment to the fuselage 2. The spar caps 10 are disposed on the inside of the cage at the corners formed between the four faces 9a-9d.

The cage 9 strengthens and stiffens the upper and lower covers 5, 6 and provides the primary structural reinforcement for the wing box structure. The cage 9 therefore replaces the stringers, and at least partially replaces the ribs, of a conventional wing box structure. This results in reduced weight and improved structural performance of the wing box as described in detail below.

The wing box may additionally include ribs (not shown), for example to provide fuel tank boundaries or to provide attachment points, for example for sensors and pipes. The ribs may be substantially transverse to the spanwise direction of the wing 3 and may be spaced along the wing span to divide the wing box into a plurality of compartments. The ribs may each comprise a substantially vertical web section which is adapted to provide the attachment points and to react loads normal to the wing surfaces, and upper and lower flange portions or rib feet which are attached to the upper and lower covers 5, 6. The ribs may further comprise cut-outs, for example for weight saving or to allow the strut sections 11 to pass through the ribs. The ribs may be lighter than the ribs used in a conventional wing structure because the cage 9 performs some of the structural functions usually carried out by ribs.

The spar cap 10 arrangement at the inside of the corners of the cage 9 allows the covers 5, 6 and spar webs 7, 8 to be attached directly to the outside of the cage 9, so the wing box may be more compact and efficiently packaged.

Figure 4A:
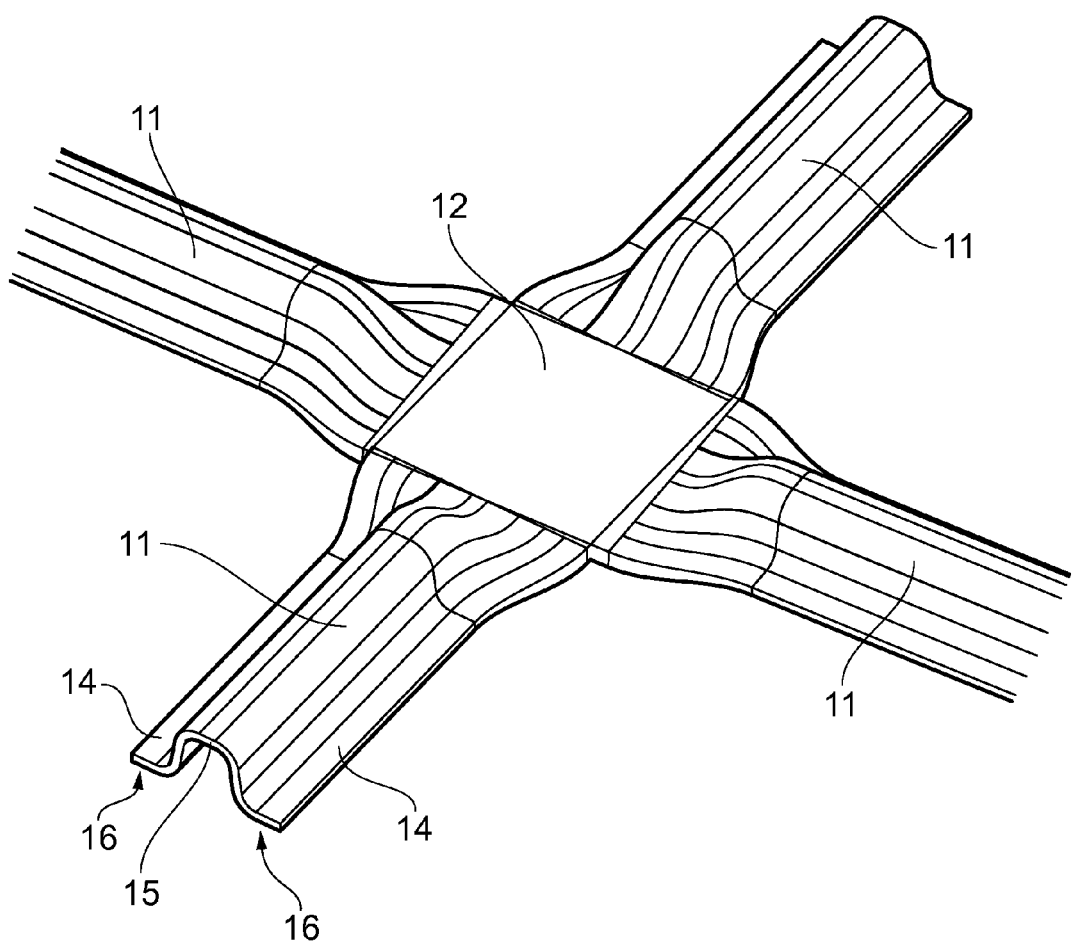
FIG. 4a illustrates a node of the space frame structure where the strut sections cross.
Figure 4B:
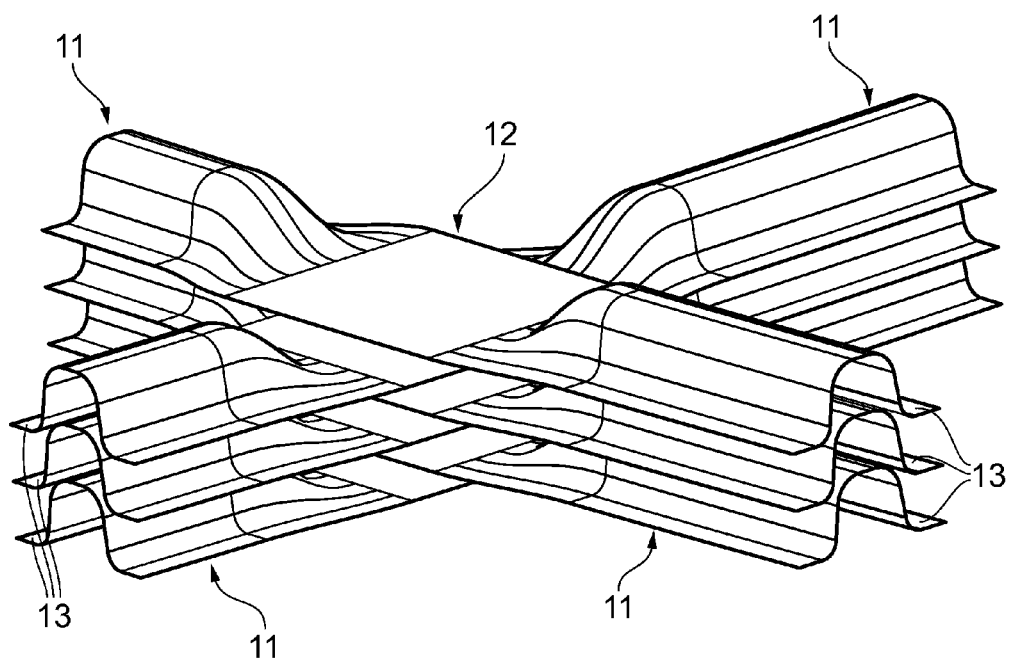
FIG. 4b illustrates an exploded view of the node showing the interleaved ply layers of the laminate strut sections.

The space frame cage 9 comprises a plurality of strut sections 11 which cross at various locations across the structure, each crossing location defining a node 12, shown in FIG. 4*a*. The strut sections 11 are laminates comprising a plurality of ply layers 13, as shown in the exploded view of the node 12 in FIG. 4*b*, and the ply layers 13 of the crossing strut sections 11 are interleaved at the node 12. By interleaving the ply layers of crossing strut sections 11, it is possible to make the structure both stronger and lighter than an equivalent wing reinforcing structure having separate, individual reinforcing members, for example ribs and stringers.

The strut sections 11 have a non-planar top-hat shaped profile for increased stiffness. The profile of each strut section comprises two flange portions 14 and an intermediate portion 15. The flange portions 14 are outwardly facing with respect to the cage 9 and provide attachment surfaces 16 for attachment of the upper and lower covers 5, 6 and for the front and rear spar webs 7, 8.

The nodes 12 are substantially planar and the profile of each strut section 11 flattens as the strut sections approach a node, as shown in FIG. 4*a*. In this way it is possible to achieve a simple, compact, interleaved node while increasing the bending stiffness of the strut sections between the nodes. The width of the strut sections 11 increases as the profile flattens so that the width of the ply layers 13 is constant through the node. In this way a constant or standard width of ply layer may be used through each node. In addition, load transfer through the node is improved as the fibres may run continuously through the node.

Figure 4C:
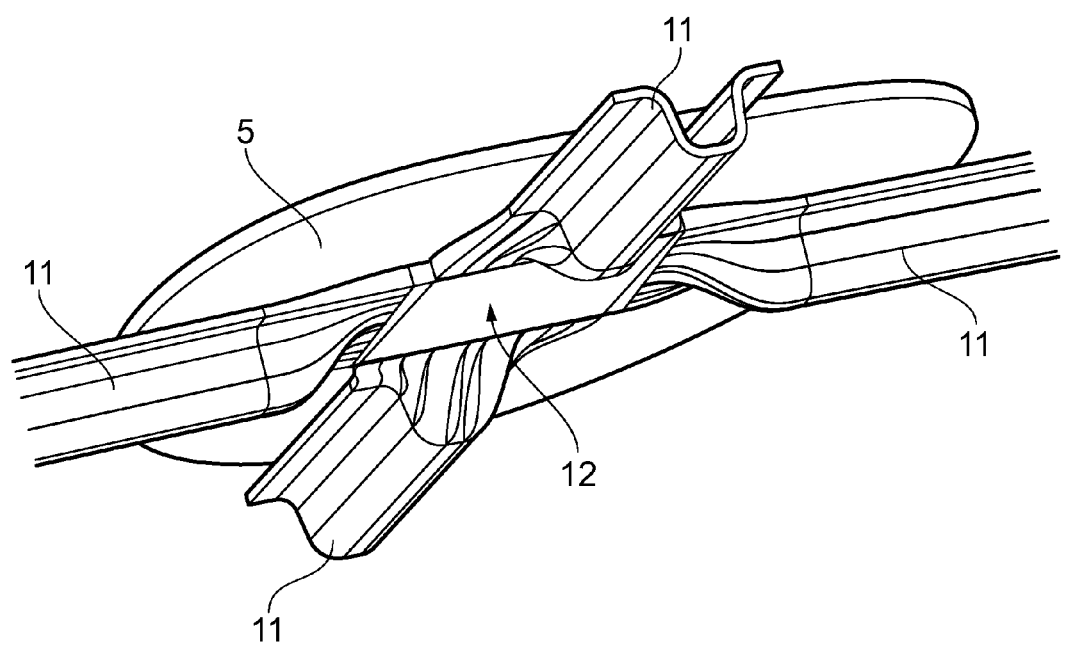
FIG. 4c illustrates attachment of the node of the space frame structure to the wing cover.

In one embodiment, the non-planar profile of each strut section 11 flattens as the strut sections approach the node 12 and tends towards a plane containing the attachment surfaces 16, as shown in FIG. 4*a*. The attachment surfaces 16 of the flange portions 14 are therefore generally co-planar with the outer surface of the node 12. The covers 5, 6 may be bolted, bonded or otherwise attached to the node 12. FIG. 4*c* illustrates mechanical fastener locations for attaching the upper cover 5 to the node 12.

Figure 5:
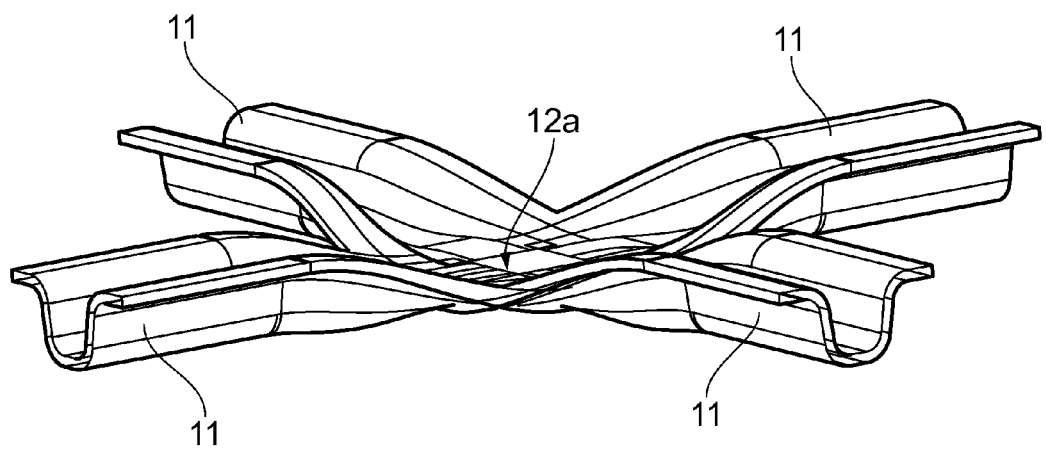
FIG. 5 illustrates an alternative embodiment of a node of the space frame structure.

In another embodiment, the non-planar profile of each strut section 11 flattens as the strut sections approach the node 12 and tends away from a plane containing the attachment surfaces 16, as shown in FIG. 5. When a panel, e.g. the cover 5 or 6, is attached to the outside of the cage 9 over the node 12*a*, the node is spaced apart from the panel, thereby increasing the polar moment. In this way, the reduction in bending stiffness of the panel at the location of a node may be minimised or eliminated.

Figure 6:
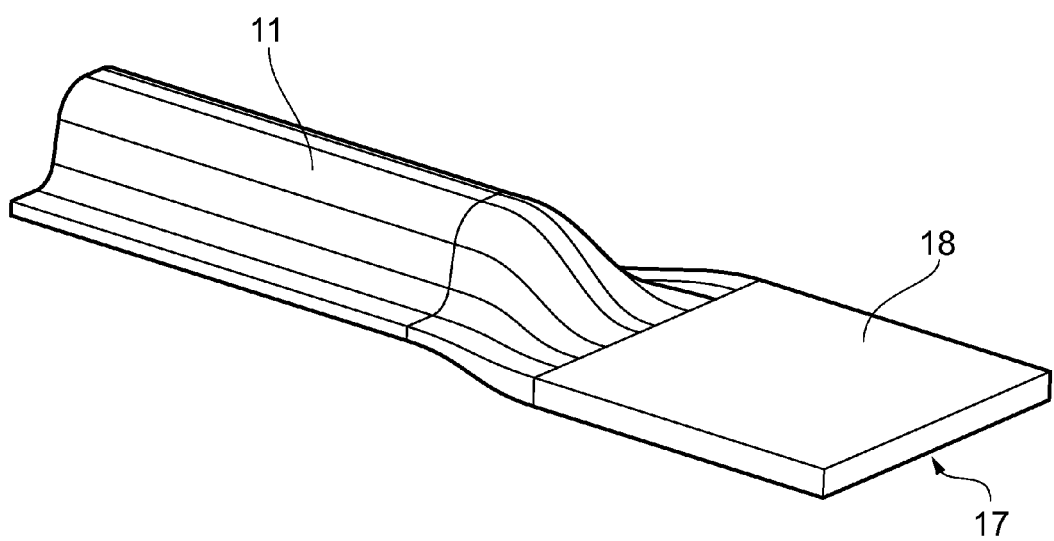
FIG. 6 illustrates a termination of a strut section.

Some of the strut sections 11 have a termination 17, as shown in FIG. 6. The generally non-planar profile of the strut section 11 flattens towards a generally planar root-end fitting portion 18 at the termination 17. The root-end fitting portion 18 is adapted to be attached to another section of the aircraft, for example to components of the fuselage 2 or to one of the wing covers 5, 6.

Figure 7:
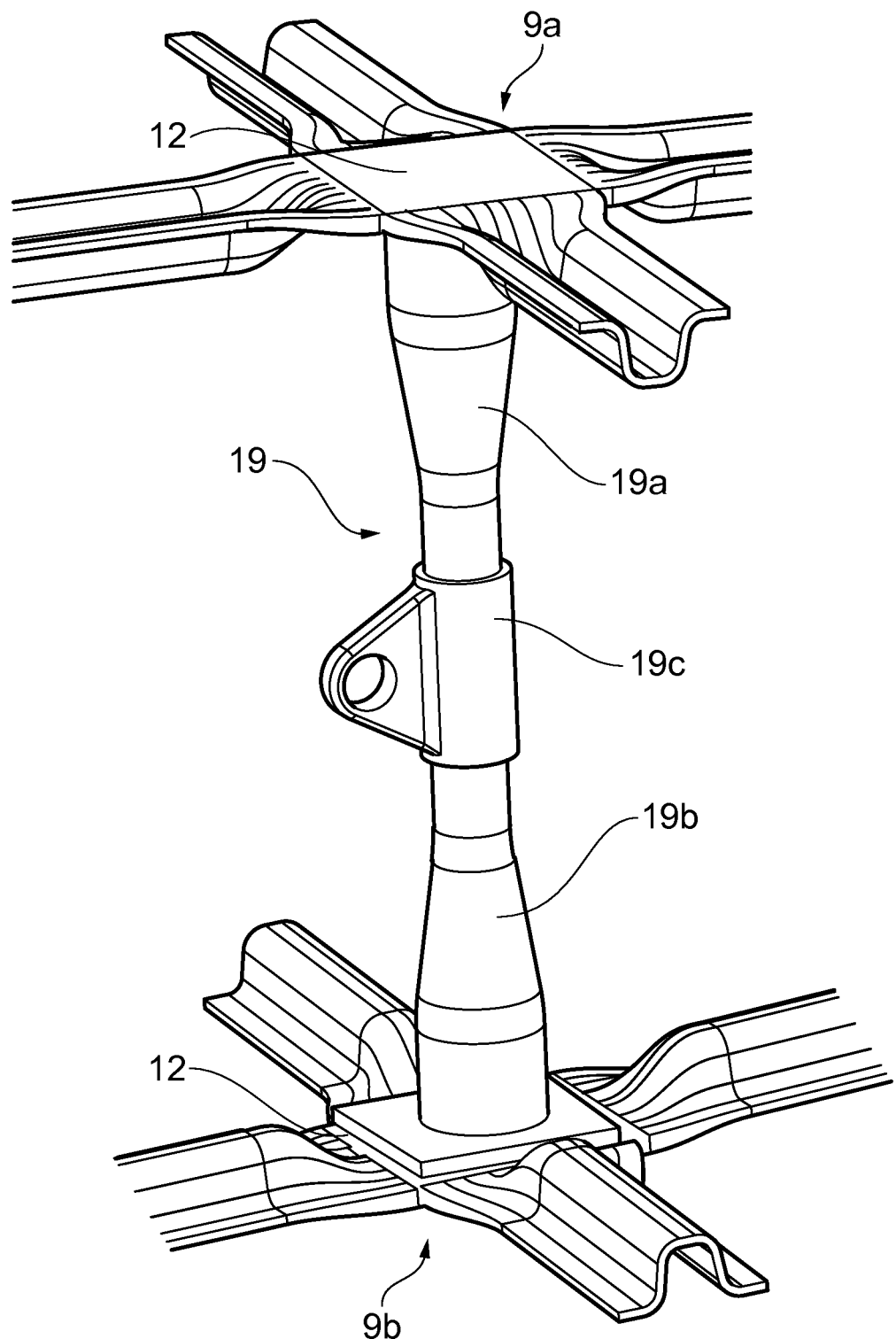
FIG. 7 illustrates a structural member between nodes on opposite sides of the space frame structure.

The space frame cage 9 comprises a plurality of opposing nodes, for example opposing nodes 12 located on the upper and lower faces 9*a*, 9*b* of the cage 9 as shown in FIG. 7. The wing box structure further comprises a structural member 19 which extends between and is attached to the opposing nodes 12. Several pairs of opposing nodes 12 are connected by similar structural members 19, although the structural members 19 have been omitted from FIG. 3 for clarity.

The structural members 19 can be readily inserted into the cage 9 through the openings between the strut sections 11 in the lattice-type space frame cage 9 after forming the cage. The structural members 19 are generally tubular struts, and comprise two pillar sections 19*a*, 19*b* and an intermediate portion 19*c*. The intermediate portion 19*c* may be screw threaded to the pillar sections 19*a*, 19*b* such that rotating the intermediate portion 19*c* with respect to the longitudinal axis of the structural member 19 moves the pillar sections 19*a*, 19*b* apart, thereby increasing the length of the structural member 19 to bring its ends into engagement with the opposing nodes 12. In this way the structural member may be positioned between two nodes and extended to meet the two nodes for attachment thereto. The strut sections 19 may be attached to the nodes 12 using mechanical fasteners or by bonding.

The structural members react loads between the upper and lower faces 9*a* and 9*b*, and can therefore transfer out of plane load applied to the upper and lower faces 9*a* and 9*b* or to the upper or lower wing covers 5 and 6, fulfilling the role of ribs in transferring out of plane compressive loads in a wing structure. The internal reinforcement provided by structural members also increases the stiffness of the cage, so that the weight of the cage is reduced.

The strut sections 11 are positioned and orientated to suit the particular design stiffness requirements for the wing 3 and are arranged in the desired load directions, and so the efficiency of the structure and the directional properties of the carbon fibre plies are maximised. The cage 9 is, therefore, able to reinforce the wing covers more efficiently than the longitudinal stringers and transverse ribs of conventional wing structures, so that the weight of the cage 9 may be reduced while providing at least the same or an improved structural performance. The strut sections 11 are more closely aligned with the longitudinal axis of the cage 9 towards the wing tip end 9*f* to resist wing twist and more closely aligned with the longitudinal axis of the aircraft fuselage 2 towards the root end 9*e* to resist bending and lift loads.

When the wing 3 is assembled, the space frame cage 9 is provided as a unitary component and the wing covers 5, 6 and spar webs 7, 8 are is positioned with respect to and attached to the cage 9. The wing covers 5, 6 and spar webs 7, 8 are attached to the attachment surfaces 9*a*-9*c* by a combination of mechanical fasteners and adhesive. In this way, the wing cover reinforcement (provided by the cage) may be applied as a unitary component and in a single operation, in contrast with the complex and time consuming prior process of positioning and attaching many stringers individually to a wing cover. The use of an integrally formed cage to reinforce the wing covers in the place of conventional stringers therefore significantly reduces the assembly time of the wing 3.

Advantageously, the simplified attachment of a unitary reinforcing cage 9 to the covers 5, 6 and spar webs 7, 8 also allows the design of the covers and spar webs to be simplified, further reducing the weight, time, cost and complexity of the manufacturing process. For example, the covers may have a uniform thickness with additional local reinforcement being provided by built up regions within the space frame cage structure. Similarly, the spar webs may have a uniform thickness. The cage 9 also provides a convenient structure for attachment of other components, and provides easy access during the assembly process through the apertures between the strut sections 11 in the lattice-type space frame structure.

Figure 8:
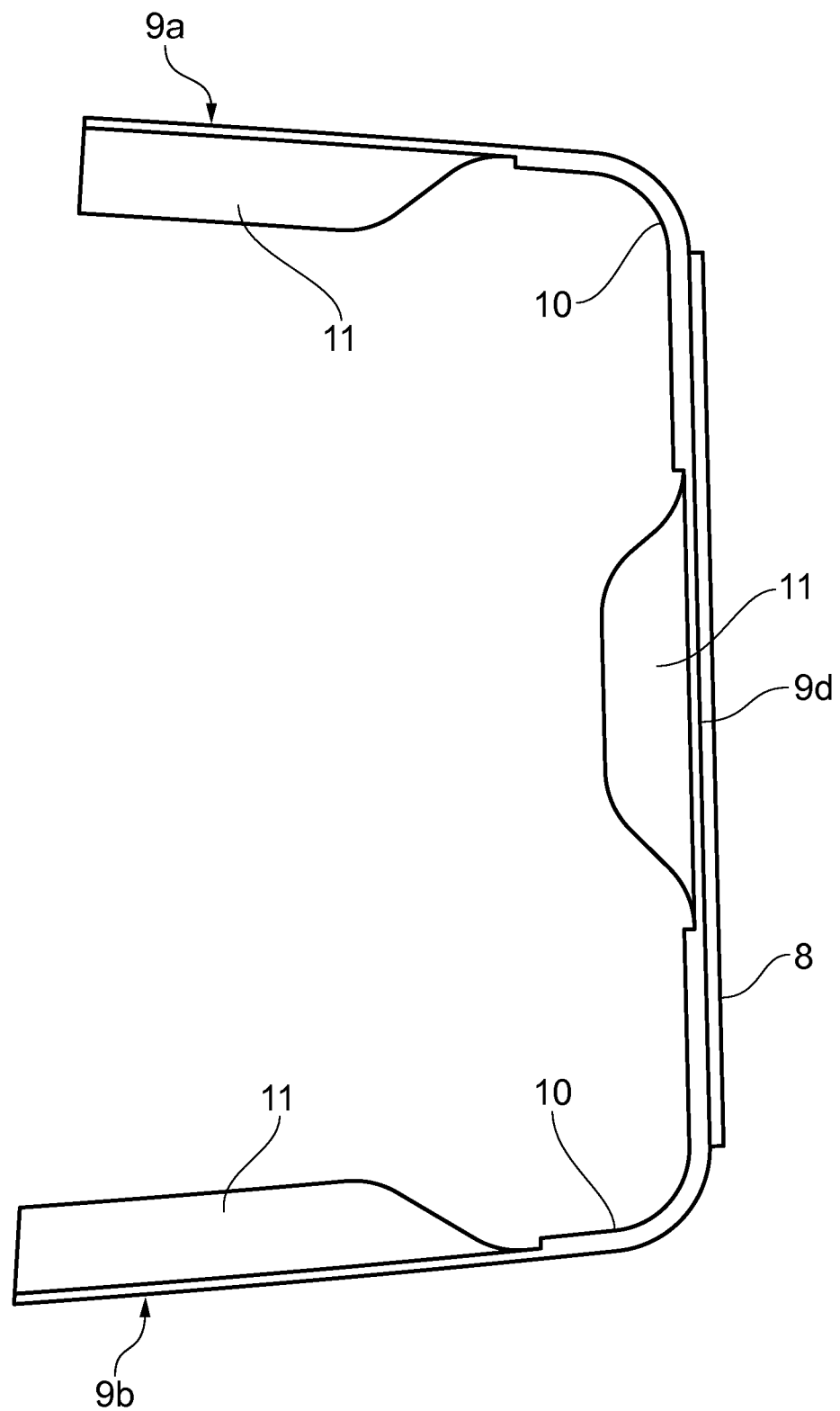
FIG. 8 illustrates in detail the attachment of the spar web and spar caps to the space frame structure.

As shown in FIG. 8, the generally non-planar strut sections 11 are flattened out at the corners between the sides 9a and 9d, and between the sides 9b and 9d of the space frame cage 9. Similarly, the generally non-planar strut sections 11 are flattened out at the corners between the sides 9a and 9c, and between the sides 9b and 9c of the space frame cage 9 at the front of the cage (not shown). The spar web 8 is fastened, bonded or otherwise affixed to the outside of the side 9d of the cage 9. Similarly spar web 8 is fastened, bonded or otherwise affixed to the outside of the side 9d of the cage 9 at the front of the cage (not shown). Respective spar caps 10 are bonded or otherwise affixed to the inside of respective corners of the cage 9.

In an alternative embodiment, the spar caps 10 are integrally formed with the cage 9. The spar caps act as further strut sections of the space frame, and define further crossing nodes of the structure. In one example, the spar caps are either laid up on the tool 20 or formed separately and placed on the tool prior to the ply deposition process. The cage 9 is then laid up, as described above, over the tool 20 and the spar caps 10. The cage 9 and the spar caps 10 are then co-cured so that the cage and spar caps form a unitary integral component. In another example, one or more of the spar caps may be integrally formed with the cage 9 by interleaving ply layers of the spar cap(s) with the ply layers 13 of the cage.

Figure 10:
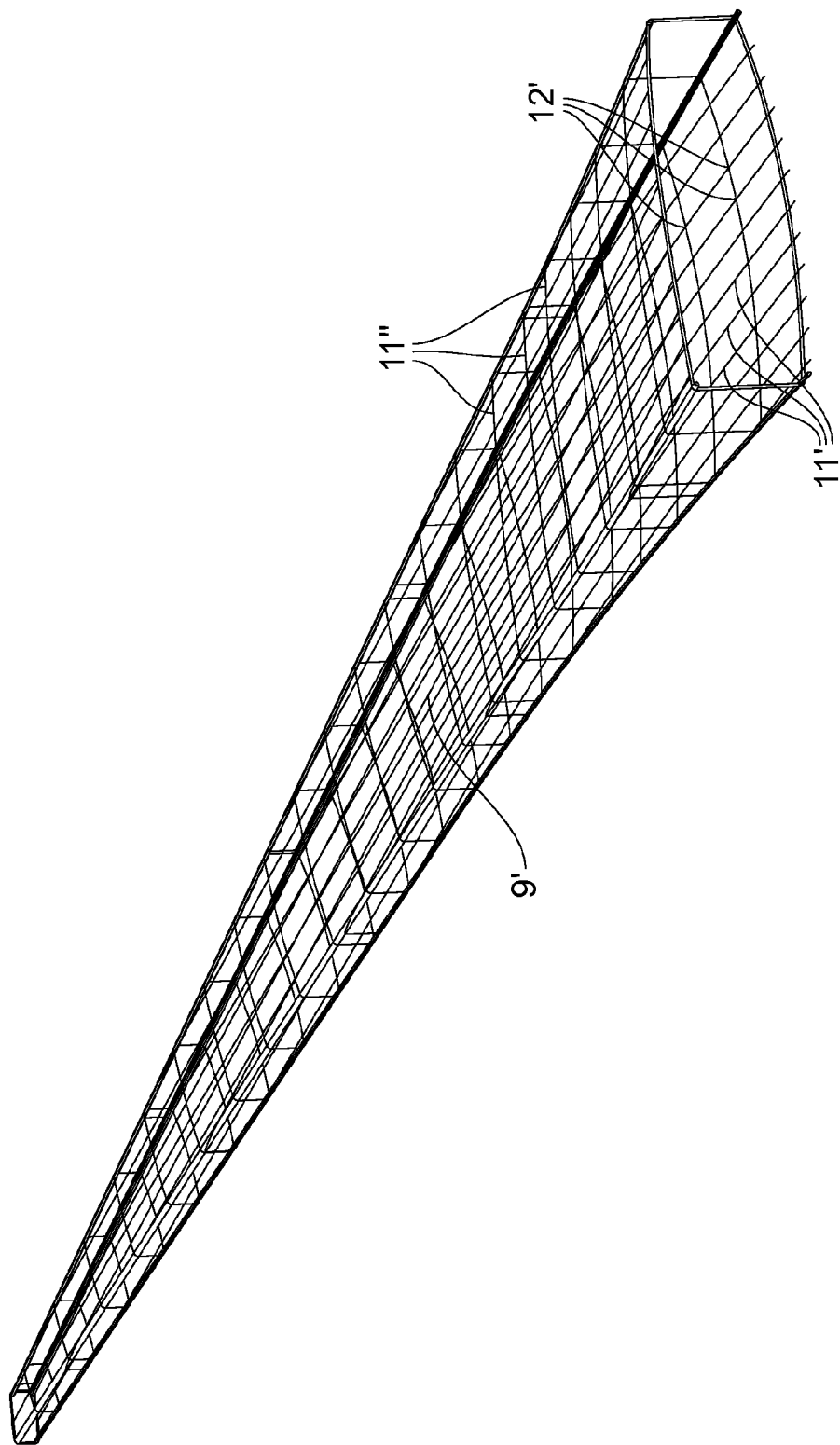
FIG. 10 illustrates an alternative embodiment of a space frame cage structure.

In an alternative embodiment, a cage 9' may be formed as an integral cage having a plurality of substantially longitudinal strut sections 11' and a plurality of substantially transverse strut sections 11", as indicated in FIG. 10. In this embodiment, the longitudinal strut sections 11' cross the transverse strut sections 11" at various locations across the structure, each crossing location defining a node 12'. Similarly to the previous embodiment, the strut sections 11' are laminates comprising a plurality of ply layers which are interleaved at the nodes 12'. The cage 9' comprises the other features described above in relation to the cage 9 and is similarly attached to the upper and lower covers 5, 6, the front and read spar webs 7, 8 and the spar caps 10.

Figure 9:
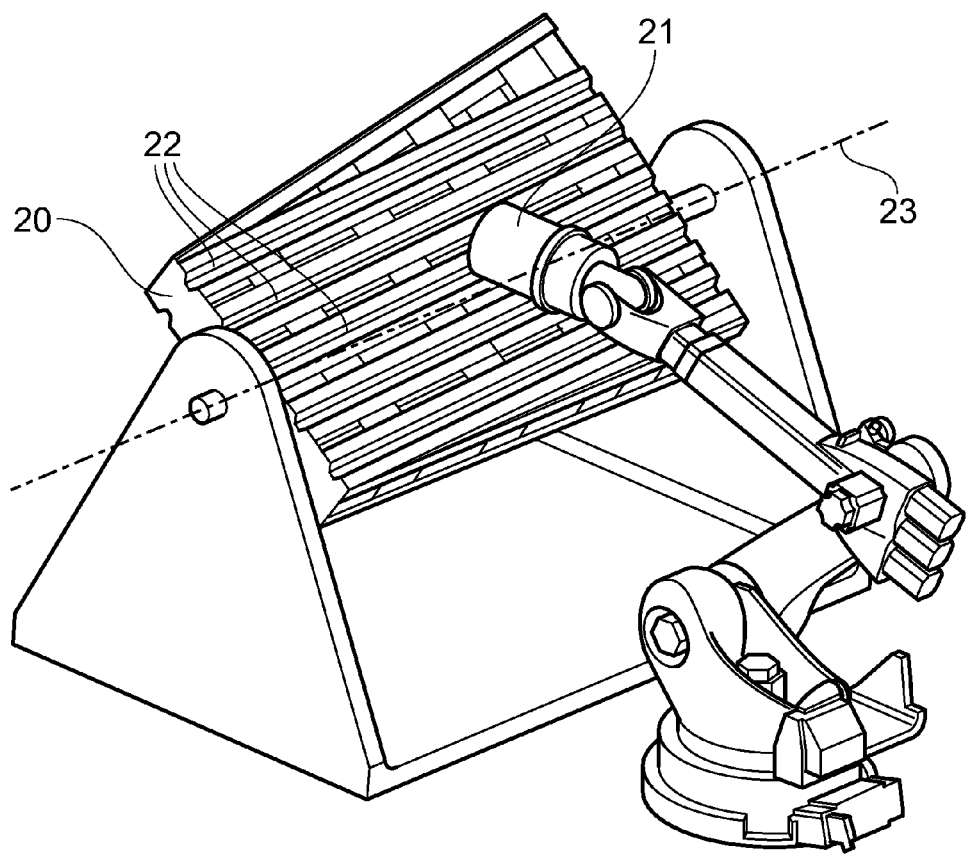
FIG. 9 illustrates a tool for forming the space frame structure.

The cage 9' is formed on a tool 20, as shown in FIG. 9. The ply layers 13 are deposited on the tool 20 as pre-preg strips in an automated ply deposition process by a deposition head 21 or by a plurality of ply deposition heads. The tool has a plurality of features 22 which are adapted to impart the desired profile shape to the strut sections 11', 11" and nodes 12' as the ply layers 13 are laid onto the tool.

The tool has a longitudinal axis 23 about which it rotates during the ply deposition process. The ply deposition head deposits ply layers for the transverse strut sections 11" as the tool 20 rotates about the longitudinal axis 23. The ply deposition head deposits ply layers for the longitudinal strut sections 11' while the tool 20 is stationary. The strut sections 11', 11" are thus formed and cross at the nodes 12'. The individual ply layers need not be continuous but the resultant space frame cage structure is unitary. Indeed, it may be preferable to terminate the ply layers to exchange for a different ply material specification.

The cage 9 is formed on a tool which is similar to the tool 20 already discussed, which rotates about a longitudinal axis during a ply deposition process. Although the tool 20 for forming the cage 9' rotates during some time periods during the ply deposition process and remains stationary during other time periods, the tool for forming the cage 9 may rotate continuously and at a constant speed as the ply deposition head moves up and down the length of the tool in the direction of the longitudinal axis, so that the ply layers 13 are deposited in closed loops which wrap around the tool forming the strut sections 11 and crossing at a plurality of nodes 12. By enabling the tool to rotate at a constant speed, the ply deposition time may be reduced and the energy required to rotate the tool may be reduced compared to a process in which a tool experiences repeated angular accelerations and decelerations.

As the ply layers 13 build up to form the cage 9, the ply layers forming each of the strut sections 11 cross at the nodes alternately so that the structure is formed with interleaved ply layers at the nodes. Therefore, although the strut sections are not all continuous, the cage itself is formed as a unitary component. The cage 9 may be built up with a single ply layer 13 deposited at each pass so that the ply layers alternate singly at each node 12. Alternatively, multiple ply layers 13 may be deposited at each pass so that at least some of the ply layers are adjacent another ply layer from the same strut section 11 at the node 12. Where multiple plies are laid simultaneously, these may include plies of different material specifications.

By manufacturing a unitary cage 9 for reinforcing the wing covers 5, 6, the wing structure no longer requires the manufacture of the plurality of different individual stringers and structural rib components which conventionally make up the wing box structure. The manufacturing process is, therefore, simplified, with fewer components and many fewer moving, laying-up, cutting, curing and inspecting operations, therefore resulting in reduced manufacturing complexity, cost and time.

In an alternative embodiment, one or both of the wing covers 5, 6 and/or one or both of the spar webs 7, 8 are bonded to the cage 9 or integrally formed with the cage.

Figure 11:
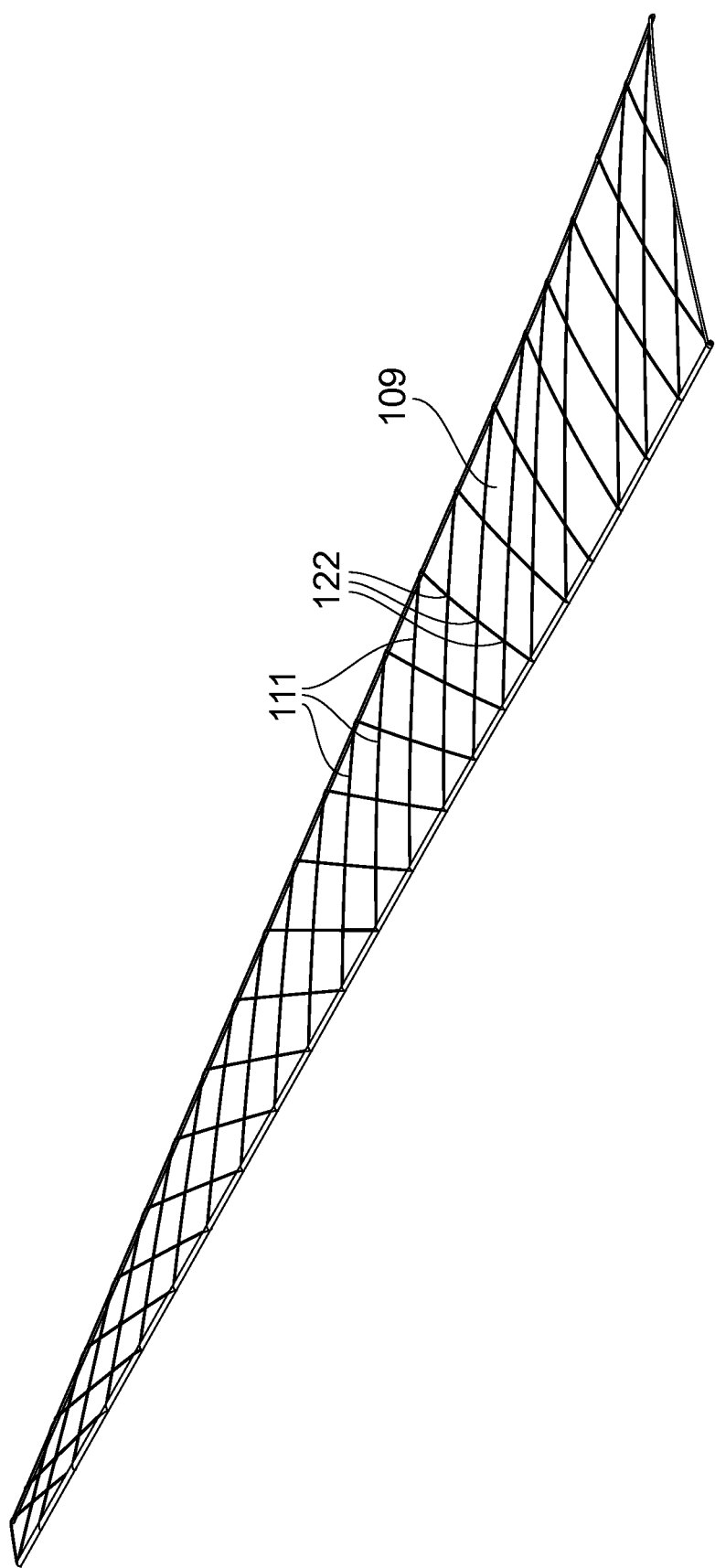
FIG. 11 illustrates a further alternative embodiment of a space frame cage structure.

In an alternative embodiment, a space frame structure 109, as shown in FIG. 11, includes a plurality of strut sections 111 which cross at one or more locations, each crossing location defining a node 112. The structure 109 does not have a closed section but instead is constructed as a panel. Similarly to the strut sections 11 of the cage 9 described above, the strut sections 111 are formed of a plurality of ply layers which are interleaved at the nodes 112. The structure 109 is formed as a unitary integral component. A wing cover may be attached to the space frame structure 109 so that the structure 109 supports and reinforces the wing cover.

In an alternative embodiment, a structure comprising a space frame including a plurality of laminate strut sections which cross at interleaved nodes is adapted to strengthen and/or stiffen any panel in any part of an aircraft or space craft or in any other structure. For example, a panel or cage may be adapted to support any aerofoil cover or skin panel or a fuselage skin panel or a floor panel in an aircraft or a floor or wall or ceiling component in a building. The space frame may take any shape suitable for strengthening and/or stiffening any panel.

In another embodiment, a structure comprising a space frame including a plurality of laminate strut sections which cross at interleaved nodes may be used as a structural component which does not have a primary function of reinforcing a panel. For example, the space frame may provide a structural lattice panel in a building or vehicle or in any other application, or a cage adapted to be used as a pillar or beam or strut in a building or vehicle or in any other application. The space frame may take any shape suitable for a structural component.

One or more aspects of each of the above described embodiments may be appropriately combined as will be appreciated by those skilled in the art.

Although the invention has been described above with reference to one or more preferred embodiments, it will be appreciated that various changes or modifications may be made without departing from the scope of the invention as defined in the appended claims.

The invention claimed is:

1. A structure comprising a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s),
wherein at least one of the strut sections has a generally non-planar profile, and
wherein a profile of the strut section flattens as the profile approaches one of the node(s).

2. The structure according to claim 1, wherein at least one of the node(s) is substantially planar.

3. A structure comprising a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s),
wherein at least one of the strut sections has a termination and a non-planar profile which flattens as the at least one of the strut sections approaches a termination of the at least one of the strut sections.

4. The structure according to claim 1, wherein the space frame includes a composite material.

5. The structure according to claim 1, wherein the space frame includes integrally formed sides.

6. The structure according to claim 1, further comprising a corner element disposed between two adjacent sides of the space frame.

7. The structure according to claim 1, wherein the space frame includes opposing nodes and a structural member extending between the opposing nodes.

8. The structure according to claim 1, wherein the space frame is a cage.

9. A structure comprising a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s),
wherein the space frame is a cage, and
wherein the cage has at least one open side.

10. The structure according to claim 1, wherein the space frame includes at least one loop portion, which extends around the perimeter of the structure.

11. The structure according to claim 1, further comprising a panel attached to the space frame.

12. A structure comprising:
a space frame including a plurality of strut sections which cross at one or more locations within the space frame to define a node at each respective crossing location, wherein the strut sections are laminates comprising a plurality of ply layers, and wherein the ply layers of the crossing strut sections are interleaved at the node(s), and
a panel attached to the space frame,
wherein at least one of the node(s) of the space frame is spaced from a surface of the panel in a direction normal to the panel surface.

13. The structure according to claim 11, further comprising a plurality of panels attached to respective sides of the space frame.

14. An aerofoil comprising a structure according to claim 1.

15. The aerofoil according to claim 14, further comprising upper and lower covers attached to opposite sides of the space frame.

16. The aerofoil according to claim 14, further comprising front and rear spars attached to opposite sides of the space frame.

17. The aerofoil according to claim 16, wherein each spar includes a spar web and upper and lower spar caps, and wherein the spar web is disposed on one of an interior or exterior side of the space frame, and the spar caps are attached to or integrally formed with the other of the interior or exterior side of the space frame.

18. The aerofoil according to claim 14, wherein the strut sections are substantially aligned with load carrying directions of the structure.

19. A method of forming a space frame structure, the method comprising the steps of:
a) providing a ply deposition device configured to deposit ply layers; and
b) depositing the ply layers to form a plurality of laminate strut sections that cross at one or more locations within the structure to define a node at each respective crossing location, such that the ply layers of the crossing strut sections are interleaved at the node(s), wherein at least one of the strut sections having a generally non-planar profile, and a profile of the strut section flattens as the profile approaches the node.

20. The method according to claim 19, wherein the ply layers are deposited on a tool which is shaped to provide at least one of the strut sections with a non-planar cross-section.

21. The method according to claim 19, wherein the structure rotates relative to the ply deposition device during the ply deposition process.

22. The method according to claim 19, wherein the structure has a longitudinal axis, and wherein the ply deposition device moves relative to the structure in the direction of the longitudinal axis during the ply deposition process.

* * * * *